United States Patent
Lin

(10) Patent No.: US 7,855,468 B2
(45) Date of Patent: Dec. 21, 2010

(54) HINGED BLADE DEVICE TO CONVERT THE NATURAL FLOW OR OCEAN OR RIVER CURRENT OR OCEAN WAVES TO ROTATIONAL MECHANICAL MOTION FOR POWER GENERATION

(76) Inventor: Cheng S. Lin, 15706 Laurelfield Dr., Houston, TX (US) 77059

( * ) Notice: Subject to any disclaimer, the term of this patent is extended or adjusted under 35 U.S.C. 154(b) by 351 days.

(21) Appl. No.: 12/229,243

(22) Filed: Aug. 21, 2008

(65) Prior Publication Data

US 2008/0309089 A1     Dec. 18, 2008

(51) Int. Cl.
*F03B 13/10* (2006.01)
(52) U.S. Cl. .......................................... 290/54; 290/43
(58) Field of Classification Search ................... 290/43, 290/44, 54, 55
See application file for complete search history.

(56) References Cited

U.S. PATENT DOCUMENTS

2008/0231057 A1* 9/2008 Zeuner ......................... 290/54

* cited by examiner

*Primary Examiner*—Tho D Ta
(74) *Attorney, Agent, or Firm*—David W. Alexander

(57) ABSTRACT

A device and method for producing rotational mechanical power is disclosed which has a plurality of hinged blades attached to a central circular hub. The device may be used to convert the kinetic energy from the movement of the wind, ocean or river currents, or tidal flows into useful rotational mechanical power. The rotational mechanical power may be converted into electrical energy. Each of the plurality of blades are attached to the central circular hub via a hinge. Each blade is also fitted with a blade limiter to restrict its motion to no more than 90° relative range from the tangent line to the central hub at the point where the blade attaches to the hub. The hinges and blade limiters allow the blades to both present a surface automatically to the motive natural fluid and to generate the maximum torque in one side and minimum resistance torque positions in the opposite side relative to the motion of the motive stream. The resultant blades relative position creates a torque differential from one side of the central hub to the other causing the hub to rotate. The central hub will rotate in the same direction regardless of the direction of flow of the natural motive stream.

7 Claims, 9 Drawing Sheets

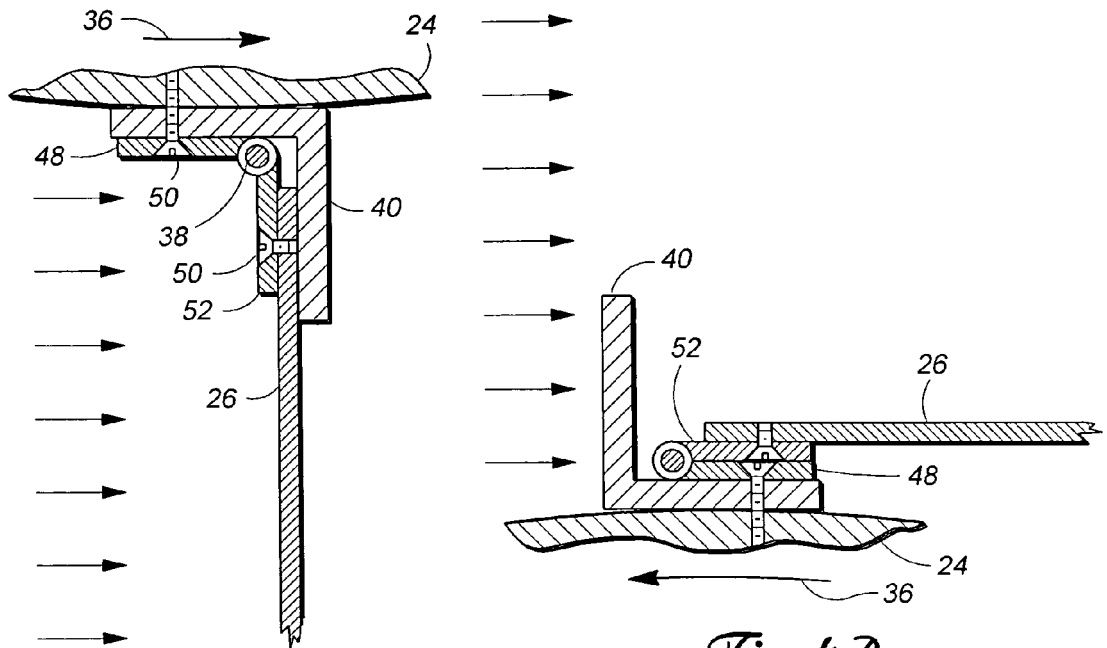
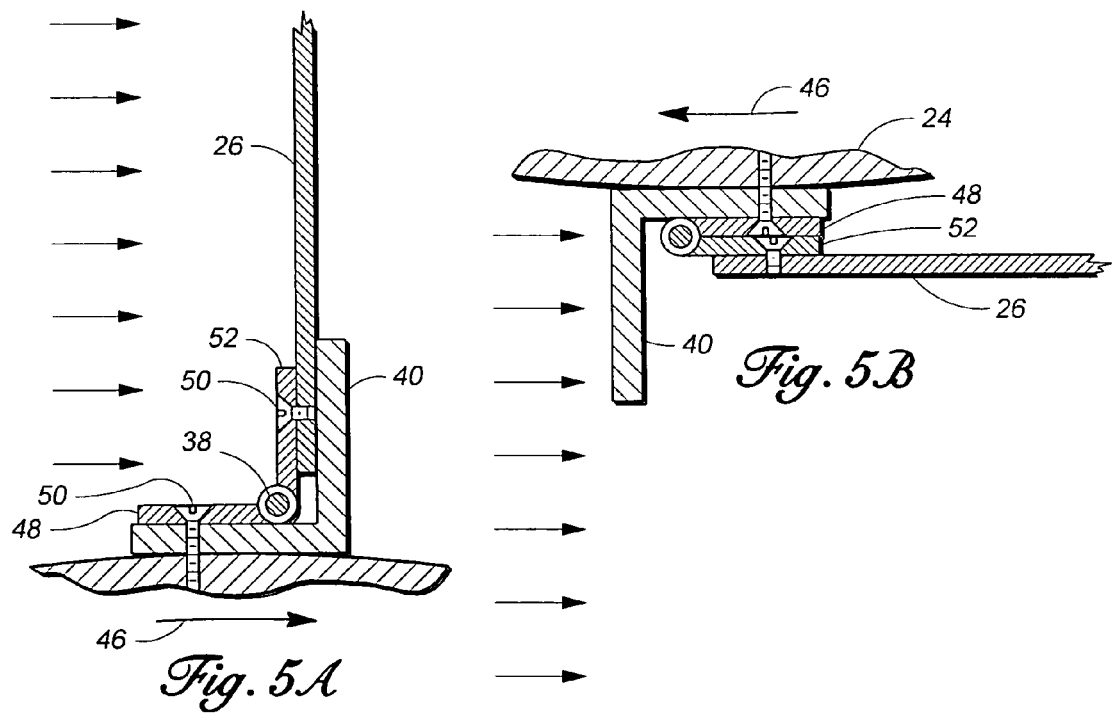

HINGED BLADE DEVICE TO CONVERT THE NATURAL FLOW OR OCEAN OR RIVER CURRENT OR OCEAN WAVES TO ROTATIONAL MECHANICAL MOTION FOR POWER GENERATION

CROSS-REFERENCES RELATED APPLICATIONS

Not applicable.

STATEMENT REGARDING FEDERALLY SPONSORED RESEARCH OR DEVELOPMENT

Not applicable.

MICROFICHE APPENDIX

Not applicable.

BACKGROUND OF THE INVENTION (1) Field of the Invention

The present invention relates to apparatus which convert the movement of a fluid, particularly air or water, into rotational mechanical motion for the generation of mechanical power or other useful purposes. In this invention, naturally flowing air as wind or water as tidal, creek, stream or river flow impinges upon hinged blades mounted on a central disk. The force of fluid upon the hinged blades induces torque to a central disk which causes it to rotate thereby producing useful rotational mechanical motion. The rotational mechanical motion may be transmitted to a generator to produce electricity or to another power take-off device to extract useful work.

The present invention further relates to apparatus which are small and economical and which may be placed in a naturally occurring stream of water or in a location with sufficient winds to generate small quantities of electrical power or other useful work. The present invention still further relates to apparatus which may be large to enormous size and placed in naturally occurring windy areas on land, or in rivers, tidal estuaries, or other large moving bodies of water, to generate large quantities of electrical energy or other useful work.

(2) Background of the Invention

Engineers have long envisioned using the natural movement of water or air as a source of energy to operate electrical power generating stations or to produce useful power for other purposes. The most commonly envisioned system using water as the motive source includes a reservoir behind a dam from which water is caused to pass through a generating station from a higher to lower elevation above and below the dam. Useful energy is also extracted from the natural movement of air by the wind turbine for generating electrical power and the wind mill for producing useful work, such as pumping water or the grinding or milling of grains.

Although these systems are generally feasible for extracting useful work from the natural movement of air or water, they require large infrastructures like dams and power generation stations or large wind turbines. Electrical power generation from the movement of water in rivers requires a dam to artificially create a substantial vertical change in height of water to produce a sufficient head or water pressure. Power generation from tidal variations are generally considered economical and practical only at the extreme northern and southern latitudes, where there is substantial difference in the elevations between high and low tides.

In spite of the difficulties in extracting useful hydroelectric power, the costs for natural gas and coal have risen to a point where renewable sources of power generation are cost-competitive. In an effort to halt climate change and cut energy imports, almost half of the states in the United States have mandated that a share of their power come from alternative or green sources. This is causing demand for alternative energy sources to increase substantially. More than two dozen companies worldwide are developing systems to extract useful power from movement of waves and currents. One of the early commercial projects is a snake-like steel tube that floats, semi-submerged, in the ocean. This device and others like it are designed to extract large quantities of power from the movement of water.

The United States Department of Energy's (DOE) "Wind Powering America" initiative has set a goal of producing five percent of the nation's electricity from wind by 2020. DOE projects meant to achieve this goal will provide $60 billion in capital investment to rural America, $1.2 billion in new income to farmers and rural landowners, and 80,000 new jobs during the next 20 years. See Wind Powering America, Draft Action Plan, Jun. 18, 1999, U.S. Department of Energy, Wind Energy Program, page 2. Farming regions in the Midwest, Great Plains, and West have emerged as major growth areas for the production of power from wind. Wind power is growing partly as a result of technology improvements and cost reductions and partly in response to state and federal laws and incentives.

Large-scale power generation from the movement of air typically requires wind turbines with blades ranging in length from 70 to 100 feet or more. The supporting posts for these blades range from about 200 to 295 feet high. Small wind generators are also known, ranging from 400 watts to 40 kilowatts or more. Wind generators of this size can meet the needs of a small family or group of families or can be targeted to specific applications. For example, a family could use a wind-driven power generator to pump water for cattle or irrigation or to light their home.

In less developed countries, there is a lack of large-scale need sufficient to justify a great expenditure of money for commercial scale electrical power generating systems and the need for electrical or other useful power is measured more by that required by an individual or his family. In these instances, wind- or water-driven power generators are much cheaper than extending power lines and are more convenient, cheaper, and less polluting than gasoline or diesel generators.

Devices for generating useful power from the wind or from tidal flow which are characterized by erratic directions of flow require steering to point the power generating device into the wind or flowing water stream or tidal flow to maximize power generation. Further, changes in direction of the wind or water can cause the device to rotate in a different direction, i.e., from clockwise to counter-clockwise or vice versa. The steering device adds a complexity to power generating devices used in natural environments with erratic flow directions of the motive fluid which is overcome by the inventive features of the invention described herein. Any changes in direction of rotation of the power generating device can cause momentary loss of power generation as the device transitions from clockwise to counter-clockwise rotation.

This invention meets the need for a small and portable apparatus for generating electrical energy or other useful power from the natural movement of water or air across its surfaces and where the flow direction of the motive fluid is erratic or may even change as much as 180 degrees in a few moments. The invention rotates in the same clockwise or counter-clockwise direction regardless of the direction of flow of the motive fluid. The invention is scalable so that it may be adapted to large scale power generation commonly associated with the developed countries.

(3) Description of the Related Art Including Information Disclosed Under 37 C.F.R. 1.97 and 1.98

Although U.S. patents or published patent applications are known which disclose various power generation devices, none of them disclose a small, portable and scalable apparatus for the extraction of mechanical energy from the natural and unpredictable movement of air and water by the means disclosed herein.

The prior art includes several devices for converting the kinetic or potential energy of naturally occurring air or water into mechanical energy or that utilize hinged blades, but none anticipate nor in combination render obvious the invention described here. Examples of power generation or motive force from the action of water upon blades may be found in U.S. Pat. Nos. 4,039,847 and 5,697,822 and in U.S. Pat. Appl. No. 2007/0182159 A1. Patents and patent applications pertaining to power generation from the wind may be found in U.S. Pat. Nos. 4,186,314; 4,278,896; 5,518,362; 6,361,275 B1 and 6,779,966 B2.

Diggs, U.S. Pat. No. 4,039,847, discloses a device and method of converting tidal currents into power. The device is comprised of one or more modules positioned in tidal water. Each module has a turbine mounted on an elevator means which moves the turbine vertically in response to water level changes during a tide. Useful power is withdrawn from the turbine. The disclosed device requires vertical movement of the turbine so that water is caused to flow over it to maintain power generation. The device disclosed in this invention does not require such limitation.

Souter, U.S. Pat. No. 5,697,822, discloses a water walking apparatus comprising a pair of buoyant platforms with paddles mounted on each of their bottom surfaces. The paddles rotate rearwardly when the user moves the apparatus forward, thus reducing resistance to forward movement. The paddles rotate forward against a specially structured stop whenever there is any backward or slipping motion of the apparatus thus resisting any backward movement of the apparatus. This device only creates useful energy as forward motion in one direction of use. The hinged blades are affixed in a linear arrangement which limits its ability to produce the desired forward motion in bodies of water which are still or flowing in a direction opposing the desired direction of motion at a rate less than the speed of forward motion.

Davis, U.S. Pat. Appl. No. 2007/0182159 A1, discloses a power generating system designed to be placed within a manhole. The system generates electricity from water flowing through sewer lines by positioning a hydro turbine that can be raised and lowered into water flowing through sewer lines. The device has fixed blades and therefore does not meet the limitations of the invention disclosed herein.

Diggs, U.S. Pat. No. 4,186,314, discloses a wind power machine for the commercial conversion of wind power into electrical energy. The wind power machine employs flip-flop wind blades which travel in an oval path and are carried by traveling chains. The Diggs device requires a chain to carry the blades in a uniform up and down direction when the device is steered into the wind. Diggs discloses a steering mechanism to point the flip-flop wind blades into the wind. The invention disclosed herein does not require steering the device into the motive fluid.

McFarland, U.S. Pat. No. 4,278,896, discloses a wind power generator with a plurality of vertically spaced rotor assemblies rotatably mounted on the support assembly and connected to an electrical generator so that electrical energy is generated as the rotors are rotated by wind. The blades are fixed upon the rotor assembly and must be steered into the wind and therefore do not meet the limitation of hinged blades.

Kivilammi, U.S. Pat. No. 5,518,362, describes a device and method for transforming wind energy into electrical energy. The device comprises several fixed rotors rotating by wind energy and connected to electricity producing generators. The blades are fixed and therefore do not meet the limitation of hinged connection to the rotor.

Wobben, U.S. Pat. No. 6,361,275 B1, reveals a wind power installation with a rotor having at least one rotor blade for converting the kinetic energy of the wind into mechanical energy and an adjusting device to make adjustments to the rotor blade based upon instantaneous loading due to local, temporary peaks in the wind speed in the rotor area. The blades are moveable about the hub but are not hinged and the device must be pointed into the wind for maximum power generation. The Wobben device does not meet the limitations of the invention disclosed herein.

Smith, U.S. Pat. No. 6,779,966 B2, discloses device and method that captures wind energy and converts it into mechanical rotational energy. The system uses rotatable airfoils that capture wind energy to generate a mechanical force, an energy coupling means for transferring the mechanical force to a horizontally mountable wheel having a shaft coupled thereto, and an energy transfer system that couples the mechanical force from the shaft to a machine. The Smith device does not disclose hinged flat blades and does not rotate in the same direction if the motive fluid changes direction by 180 degrees and therefore does not meet the limitations of the invention disclosed herein.

BRIEF SUMMARY OF THE INVENTION

The present invention is a device to harness useful rotating mechanical power from the natural movement of wind, river or ocean current, ocean wave, or tidal flow. The rotating mechanical power can be converted to electrical energy using means well known to those skilled in such arts. By means of hinged blades, the device rotates in one direction regardless of the direction of flow of water or air across its surfaces and once positioned does not require steering to maintain perpendicularity with the flow direction of the motive fluid to maximize power generation.

BRIEF DESCRIPTION OF THE SEVERAL VIEWS OF THE DRAWINGS (1) Drawing Figures

The drawings illustrate the preferred and alternate embodiments of the device. It is to be understood that in some instances various aspects of the invention may be shown exaggerated or enlarged to facilitate an understanding of the invention.

Figure 3A:
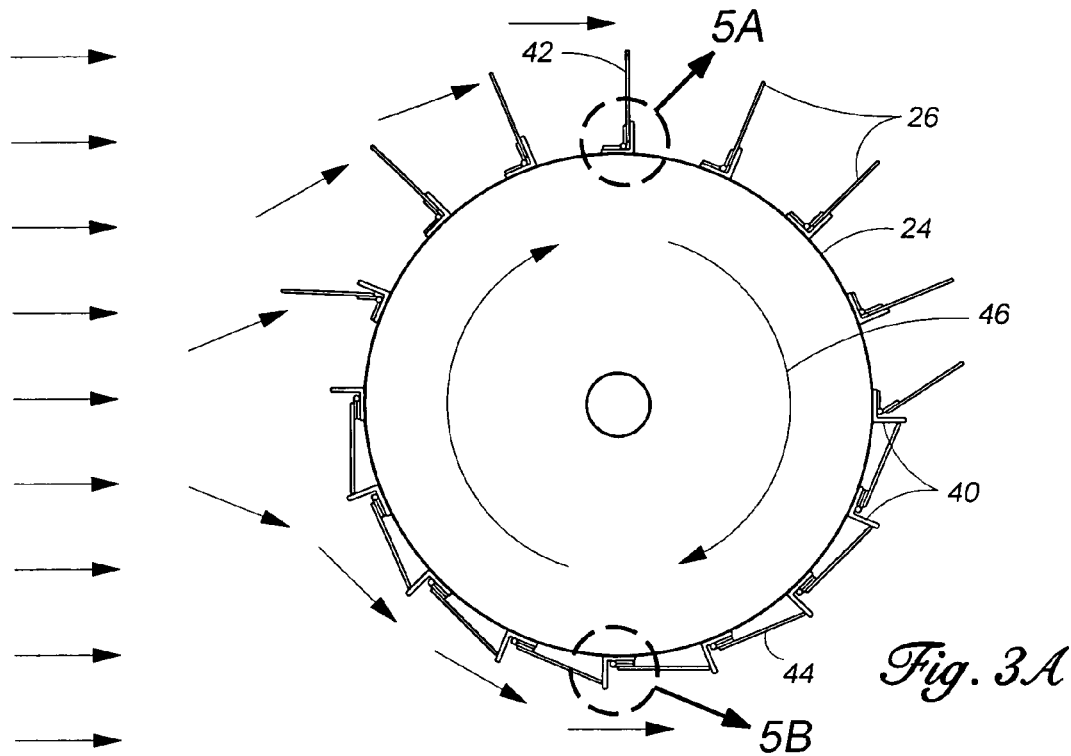
Figure 3B:
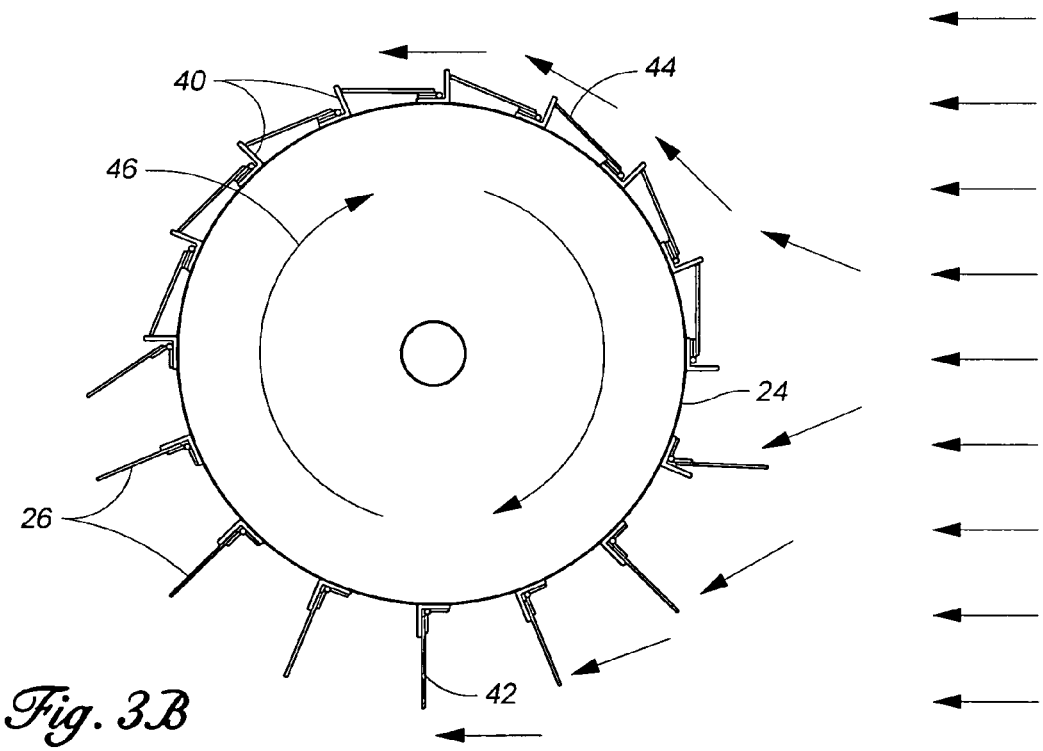

FIGS. 3A and 3B picture the hinged blades affixed to the central hub with persistent clockwise rotation with the motive fluid approaching from 180 degree opposed directions.

Figure 2A:
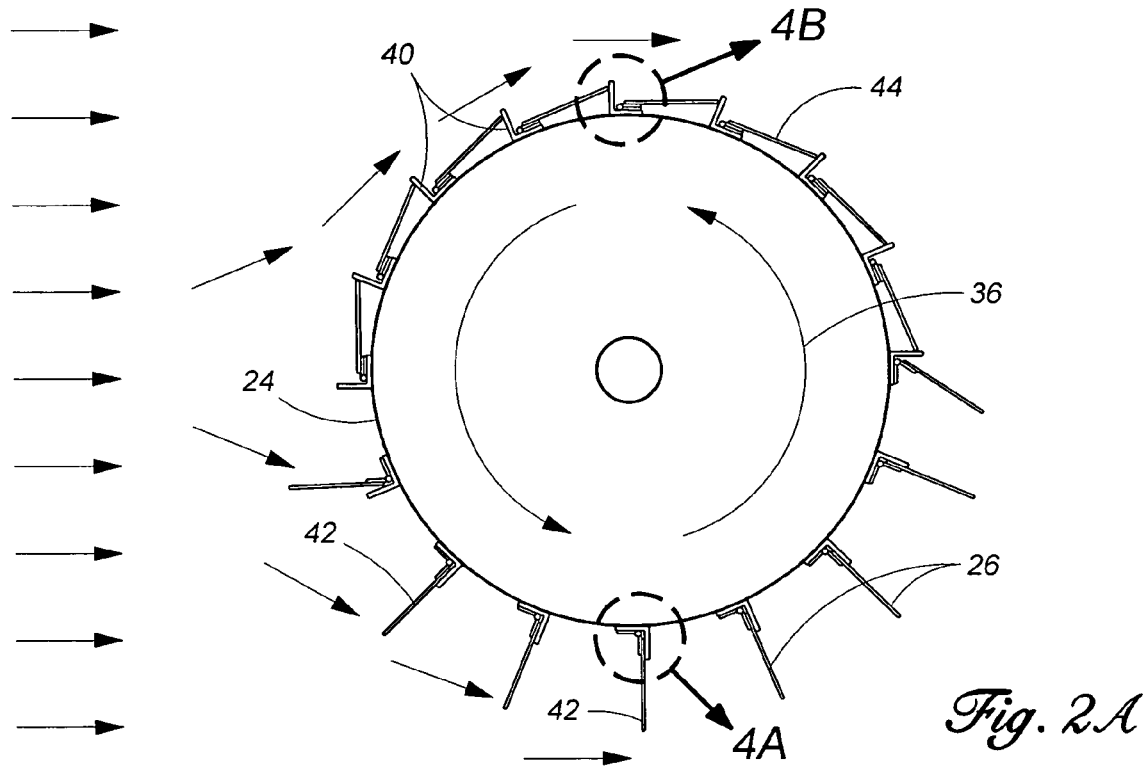
FIGS. 2A and 2B depict the hinged blades affixed to the central hub with persistent counterclockwise rotation with the motive fluid approaching from 180 degree opposed directions.
Figure 2B:
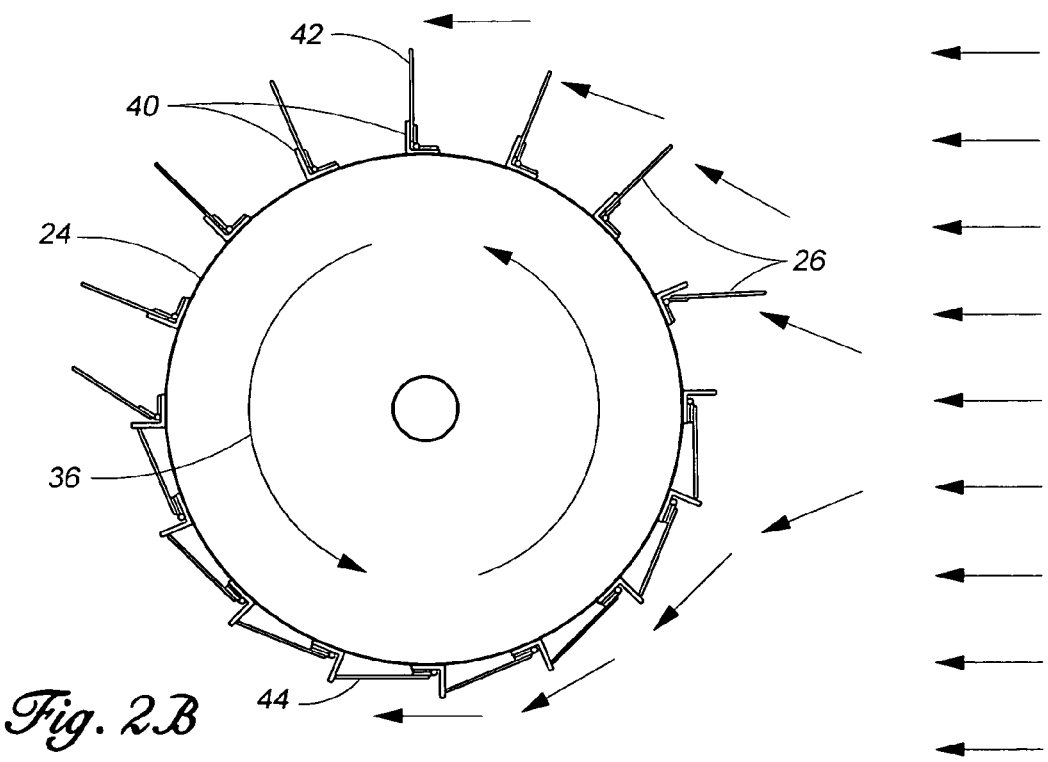

FIGS. 4A and 4B show detail views of the hinged blades in respective power producing and least resistance to flow positions when affixed to the hub rotating in counterclockwise direction and corresponds to FIGS. 2A and 2B.

FIGS. 5A and 5B exhibit detail views of the hinged blade in respective power producing and least resistance to flow positions when affixed to the hub rotating in clockwise direction and corresponds to FIGS. 3A and 3B.

Figure 6:
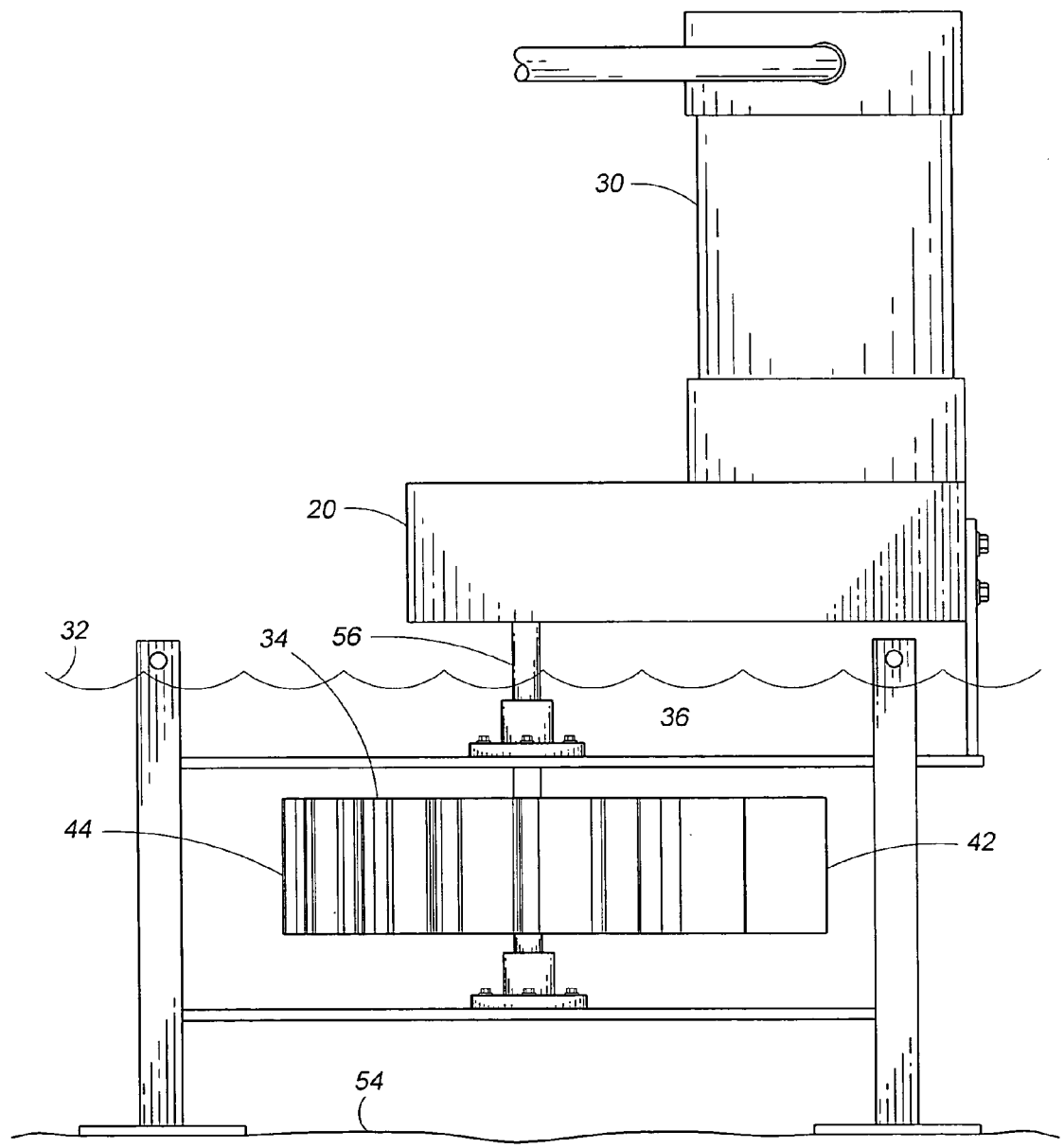

FIG. 6 shows the invention submerged in a moving stream.

Figure 7:
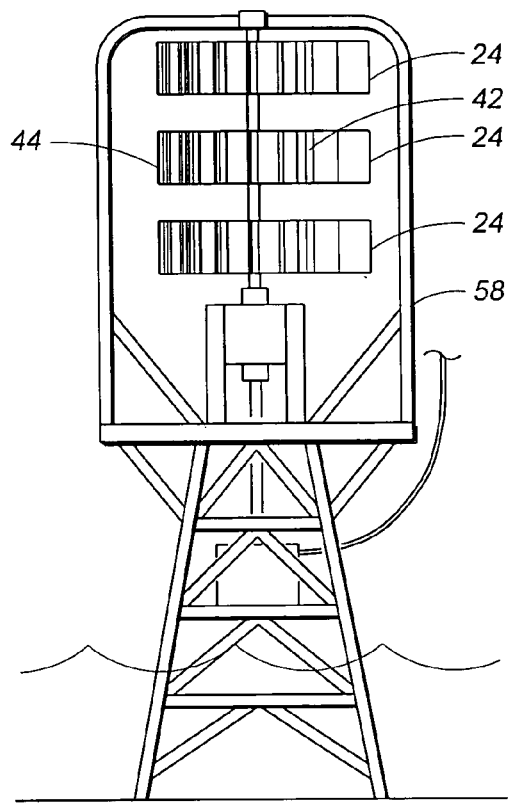

FIG. 7 displays the invention on a commercial scale size with three horizontally mounted central hubs for producing power from wind.

Figure 8:
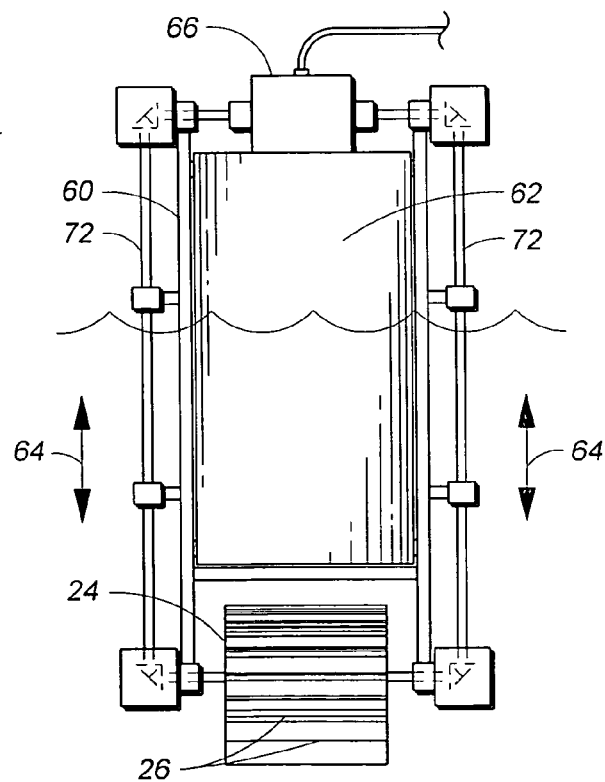

FIG. 8 depicts the invention in a commercial scale size mounted on a buoy.

Figure 9:
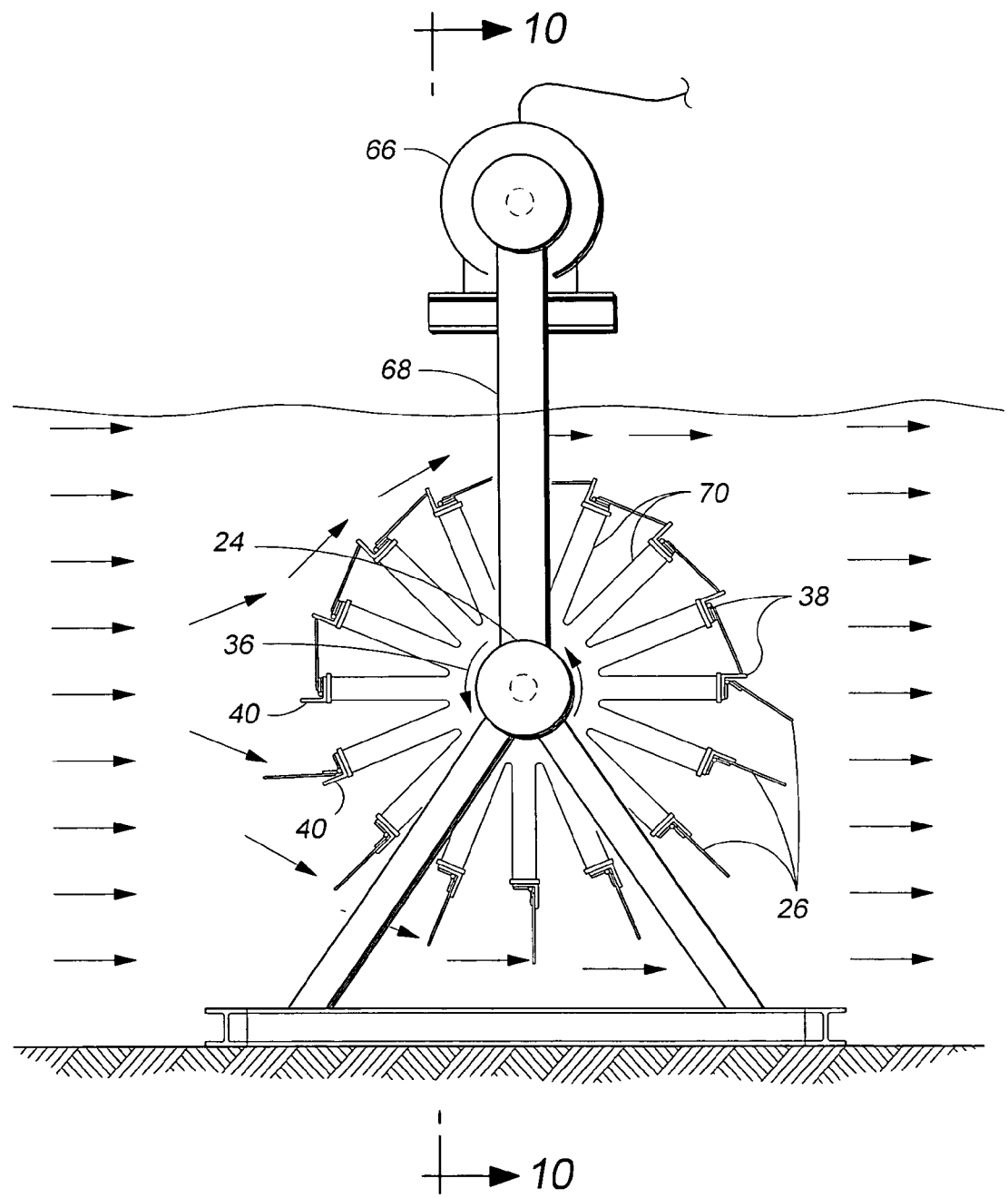

FIG. 9 shows the side view of another embodiment of the device submerged in a flowing river.

Figure 10:
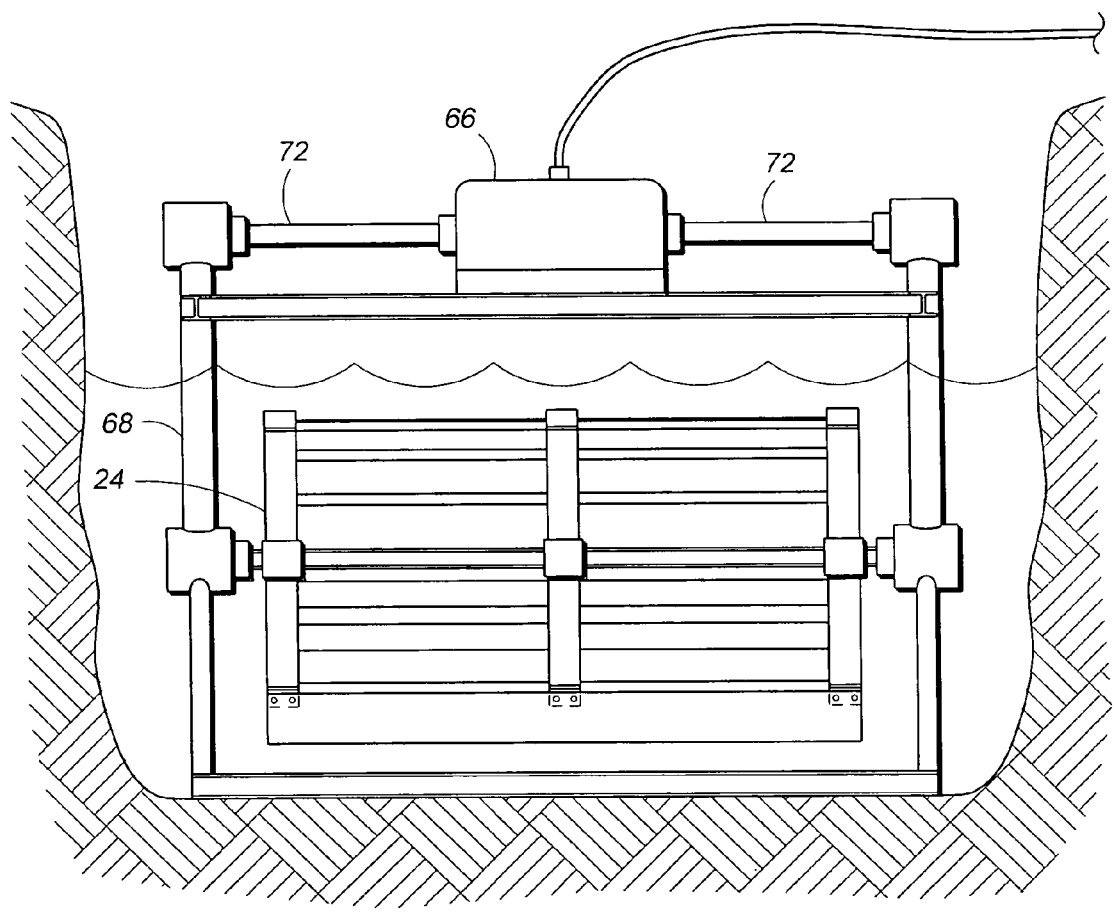

FIG. 10 depicts a view from upstream or downstream of the device shown in FIG. 9.

Figure 11A:
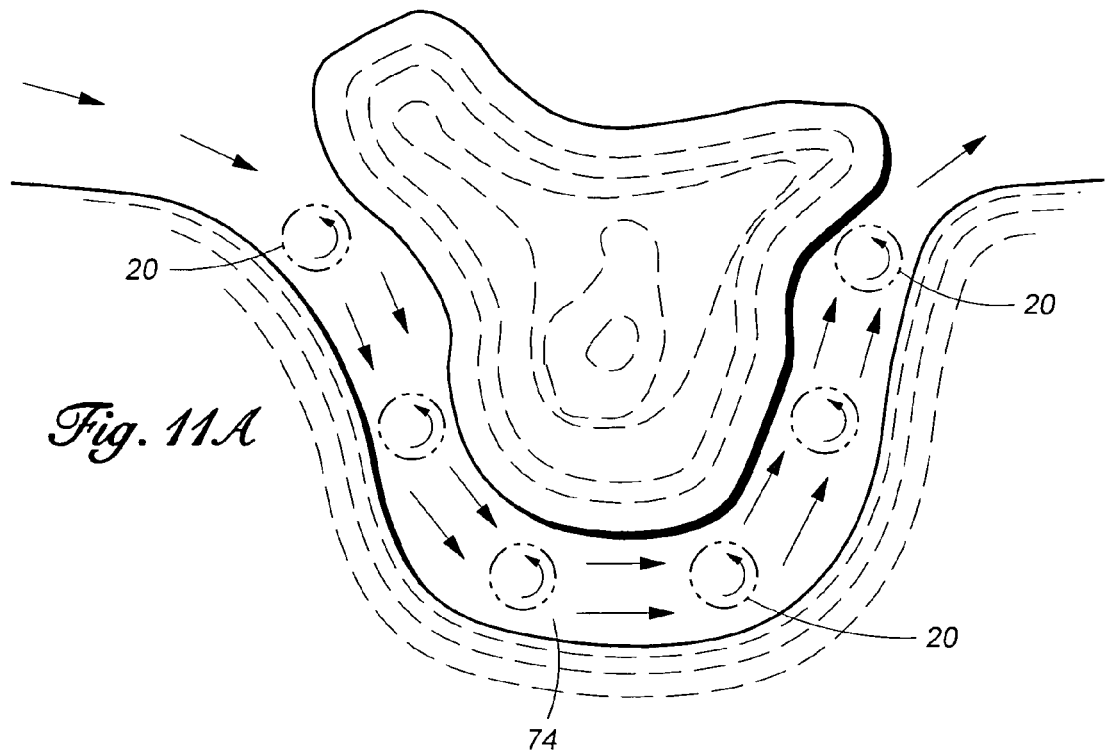
Figure 11B:
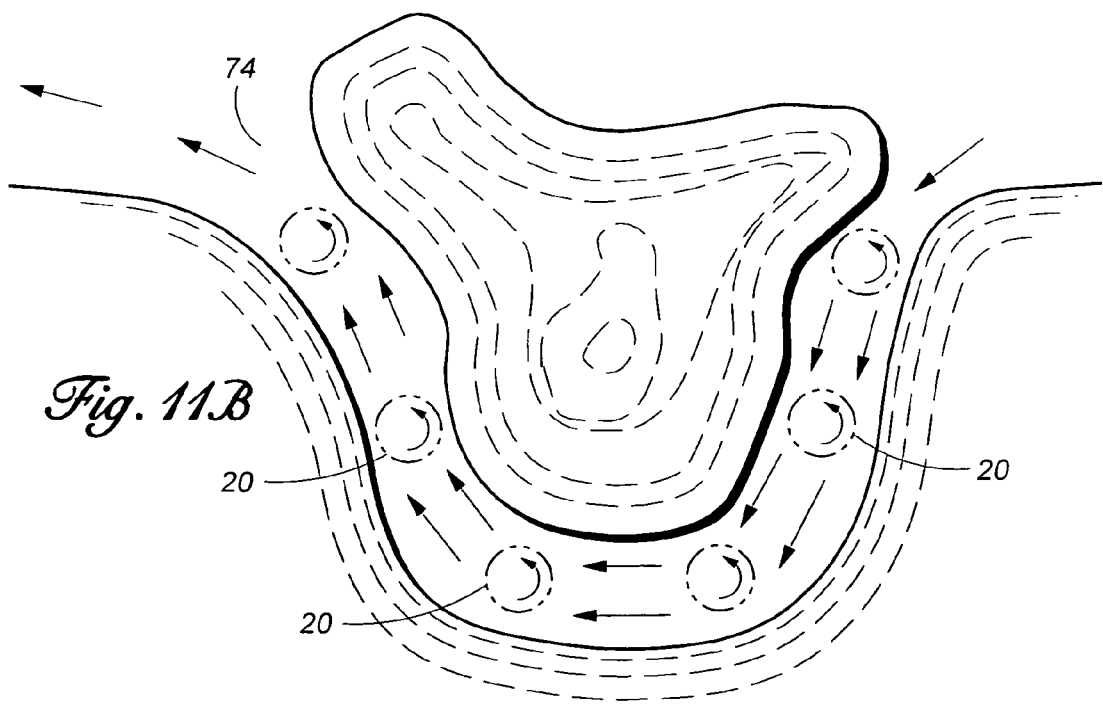

FIGS. 11A and 11B show several of the devices in commercial scale size positioned in a channel, each of which rotate in the same direction regardless of the direction of flow of the water stream and produce rotational mechanical energy independent of each other.

(2) Reference Numerals Used in Drawings

| 20 | Portable Power Producing Device | 22 | Support Structure |
| --- | --- | --- | --- |
| 24 | Central Hub | 26 | Blades |
| 28 | Power Take-Off Assembly | 30 | Electrical Generator |
| 32 | Surface of Water | 34 | Direction of Water Flow |
| 36 | Counter Clockwise Direction Arrow | 38 | Hinge |
| 40 | Blade Limiter | 42 | Blade in Fully Extended Position |
| 44 | Blade in Least Extended Position | 46 | Clockwise Direction Arrow |
| 48 | Leaf of Hinge 38 attached to Central Hub 24 through Blade Limiter 40 | 50 | Fastener |
| 52 | Leaf of Hinge 38 attached to Blade 26 | 54 | Bottom of Stream |
| 56 | Shaft | 58 | Commercial Scale embodiment for Generating Power from Wind |
| 60 | Commercial Scale embodiment for Generating Power from Wave Action | 62 | Buoy |
| 64 | Wave Action | 66 | Variable Speed Generator |
| 68 | Commercial Scale embodiment for Generating Power from River Flow | 70 | Arm supporting Blade 24, Hinge 38, and Blade Limiter 40 |
| 72 | Linkage | 74 | Channel |

DETAILED DESCRIPTION OF THE PREFERRED EMBODIMENT

Figure 1:
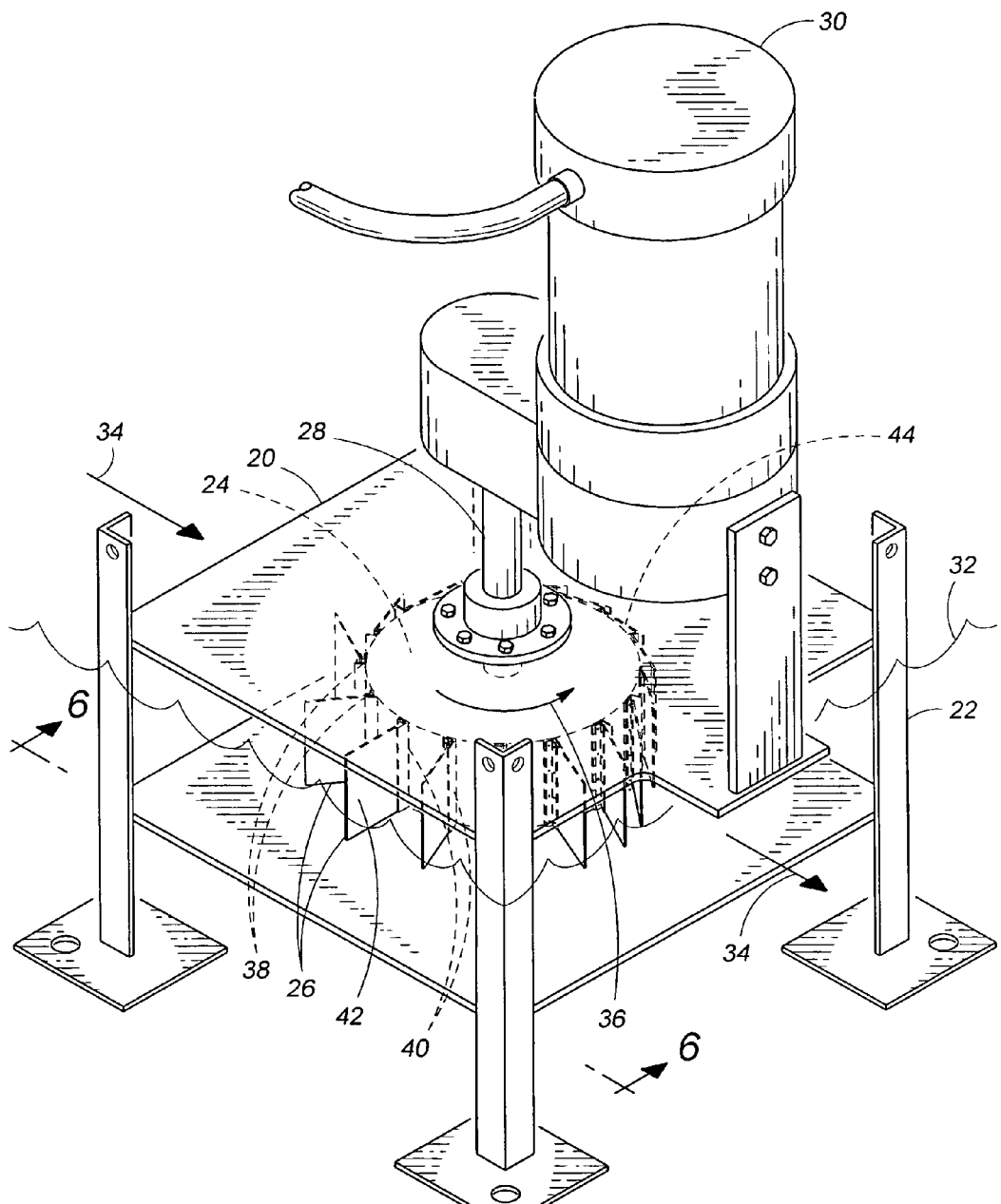
FIG. 1 shows the preferred embodiment of the power generation device suitable for use in small streams.

FIG. 1 illustrates the preferred embodiment of the invention. The portable power producing device 20 comprises a support structure 22, central hub 24, a plurality of blades 26, a power take off assembly 28 connected to central hub 24, further connected to an electrical generator 30. Each blade 26 is connected to central hub 24 by hinge 38. Central hub 24 is submerged in water of about level 32. The water is moving in direction 34 which causes the central hub 24 to rotate in counterclockwise direction depicted by arrow 36.

Continuing to refer to FIG. 1, the motion of the water against blades 26 causes them to rotate about the hinges 38. Every blade 26 is free to rotate about its hinge 38 within 90 degrees which is inside the limits of the blade limiter 40. Each blade 26 opens to the appropriate extent within the limits imposed by blade limiter 40 depending on the motive fluid direction and the position of the central hub 24. When a blade 26 is in its fully extended position 42 it is presenting its maximum torque generating surface area to the water flowing around the portable power producing device 20. Conversely, when a blade 26 is in its least extended position 44 it is presenting its minimum counter torque generating surface area.

The ability of the blade 26 to rotate about their hinges 38 within the limits imposed by blade limiters 40 permits each blade to induce a torque into central hub 24. The imbalanced torque imposed upon central hub 24 caused by the water impinging upon the total surface area of extended blades 42 on one side of central hub 24 compared to the non-extended blades 44 on the other side causes central hub 24 to rotate.

FIG. 2A shows central hub 24, blades 26, and blade limiters 40 mounted in position to cause central hub 24 to rotate in counterclockwise direction 36 with the motive fluid flowing from left to right.

FIG. 2B shows central hub 24, blades 26, and blade limiters 40 mounted in position to cause central hub 24 to rotate in the same counterclockwise direction 36 as the hub depicted in FIG. 2A with the motive fluid flowing from right to left and no other change of position of central hub 24, blades 26 or blade limiters 40.

FIG. 3A shows central hub 24, blades 26, and blade limiters 40 mounted in position to cause central hub 24 to rotate in clockwise direction depicted by arrow 46 with the motive fluid flowing from left to right.

FIG. 3B shows central hub 24, blades 26, and blade limiters 40 mounted in position to cause central hub 24 to rotate in the same clockwise direction 46 as the hub depicted in FIG. 3A with the motive fluid flowing from right to left and no other change of position of central hub 24, blades 26 or blade limiters 40.

FIG. 4A depicts a detail of a blade 26, hinge 38, and blade limiter 40 mounted on central hub 24 in the power producing position to cause 24 to rotate in counter clockwise direction 36. In this figure blade 26 is presenting its maximum torque generating surface area to the motive fluid. One hinge leaf 48 of hinge 38 is attached to central hub 24 by fastener 50 through blade limiter 40. The other hinge leaf 52 of hinge 38 is attached to blade 26 by fastener 50. Blade limiter 40 prevents blade 26 from extending more than 90 degrees from its tangent line with central hub 24.

FIG. 4B depicts a detail of a blade 26, hinge 38, and blade limiter 40 mounted on central hub 24 in the least resistance to flow direction to allow 24 to rotate in counter clockwise direction 36. In this figure blade 26 is presenting its least torque producing surface area to the motive fluid. When in the least resistance to flow direction, hinge leaf 48 and hinge leaf 52 of hinge 38 are at their minimum resistance torque position thereby allowing blade 26 to be practically parallel to the flow of motive fluid.

FIG. 5A depicts a detail of a blade 26, hinge 38, and blade limiter 40 mounted on central hub 24 in the power producing position to cause 24 to rotate in a clockwise direction 46. In this figure blade 26 is presenting its maximum torque generating surface area to the motive fluid. One hinge leaf 48 of hinge 38 is attached to central hub 24 by fastener 50 through blade limiter 40. The other hinge leaf 52 of hinge 38 is attached to blade 26 by fastener 50. Blade limiter 40 prevents blade 26 from extending more than 90 degrees from its tangent line with central hub 24.

FIG. 5B depicts a detail of a blade 26, hinge 38, and blade limiter 40 mounted on central hub 24 in the least resistance to flow direction to allow 24 to rotate in a clockwise direction 46. In this figure blade 26 is presenting its least resistance surface area to the motive fluid. When in the least resistance to flow position, hinge leaf 48 and hinge leaf 52 of hinge 38 are at their minimum open position thereby allowing blade 26 to be practically parallel to the flow of motive fluid.

FIGS. 2A and 2B illustrate a view looking down on central hub 24 positioned in a flow of either wind or water moving respectively from left to right or right to left. Viewing FIGS. 2A and 2B together show that regardless of the direction of flow of the motive fluid, central hub 24 will rotate counterclockwise 36. In FIG. 2A, blade 42 on central hub 24 is in its maximum torque producing position. In the same figure, blade 44 on central hub 24 is in the least resistance to flow and minimum counter torque producing position. The difference in the torque produced by blade 42 and blade 44 presented to the motive fluid cause central hub 24 to rotate in counterclockwise direction 36 when the motive fluid is flowing from left to right. In FIG. 2B, the same central hub 24 shows blade 42 is in its maximum torque producing position and blade 44 is in its least resistance to flow and minimum counter torque producing position. The difference in the torque produced by blade 42 and blade 44 presented to the motive fluid cause central hub 24 to rotate in the counterclockwise direction 36 even with the motive fluid moving from right to left. Once the blade limiters 40, hinges 38, and blades 26 are mounted on central hub 24 as shown in FIGS. 2A and 2B, central hub 24 will rotate counter clockwise regardless of the direction of flow of the motive fluid.

FIGS. 3A and 3B illustrate a view looking down on central hub 24 positioned in a flow of either wind or water moving respectively from left to right or right to left. Viewing FIGS. 3A and 3B together show that regardless of the direction of flow of the motive fluid, central hub 24 will rotate in clockwise direction 46. In FIG. 3A, blade 42 on central hub 24 is in its maximum torque producing position. In the same figure, blade 44 on central hub 24 is in the least resistance to flow and minimum counter torque producing position. The difference in the torque produced by blades 42 and 44 cause central hub 24 to rotate in clockwise direction 46 when the motive fluid is flowing from left to right. In FIG. 3B, the same central hub 24 shows blade 42 in its maximum torque producing position and blade 44 in its least counter torque producing position. The difference in the torque produced by blades 42 and 44 cause central hub 24 to rotate in clockwise direction 46 even with the motive fluid moving from right to left. Once the blade limiters 40, hinges 38, and blades 26 are mounted on central hub 24 as shown in FIGS. 3A and 3B, central hub 24 will rotate clockwise regardless of the direction of flow of the motive fluid.

As depicted in FIGS. 2A and 2B and 3A and 3B, regardless of the direction of flow of the motive fluid, the clockwise or counterclockwise rotation of central hub 24 is determined solely by the position of blade limiter 40 on central hub 24. The device does not have to be steered into the motive fluid to obtain maximum torque. Maximum torque in clockwise or counter clockwise rotation is produced regardless of the direction motive fluid.

FIG. 6 shows device 20 positioned in a stream of water with nominal water surface 32 and stream bottom 54. In this view, water is flowing into the figure. Blade 42 on the right of central hub 24 is in its maximum torque producing position. Blade 44 on the left side of central hub 24 is in the least counter torque position. The torque produced by the flowing water impinging blades 42 and 44 cause central hub to rotate counter clockwise 36 when viewed from above device 20. The rotation of central hub 24 causes shaft 56 to rotate and transfer rotational energy to electrical generator 30. If the direction of flow of water changes in any way, central hub 24 will still rotate in the counter clockwise direction 36.

FIG. 7 depicts a commercial scale power producing device 58 positioned to generate power from the wind. Regardless of the direction of the wind, central hubs 24 will rotate either clockwise or counterclockwise depending on how the blade limiters are mounted on the central hubs. In this figure, the nominal wind direction is into the page. Looking at the middle of the three central hubs depicted in FIG. 7, blade 42 on the right side is in its maximum torque producing position and blade 44 on the left is in its least counter torque producing position. In this configuration, the central hubs 24 will rotate in the counter clockwise direction when viewed from above. If the nominal wind direction changes to flow from any other direction, central hubs 24 will still rotate counterclockwise direction. Therefore device 58 will produce power from a wind of a given speed regardless of the direction the wind approaches 58 and without 58 having to be steered into the wind. FIG. 7 also shows that a plurality of central hubs may be ganged together to increase the amount of power generated from the wind.

FIG. 8 depicts commercial scale power producing device 60. Device 60 comprises a buoy 62 connected to central hub 24. Up and down wave action 64 causes buoy 62 to move up and down which causes central hub 24 to rotate due to the impingement of water upon blades 26 mounted on central hub 24. Central hub 24 will rotate in either clockwise or counterclockwise direction depending on the initial installation of the blades 26, hinges 38, and blade limiters 40. Rotation of central hub 24 is transferred to variable speed generator 66 via linkage 72.

FIGS. 9 and 10 show side and front views of a commercial scale power producing device 68 submerged in a river or tidal estuary. In FIG. 9, device 68 comprises a plurality of arms 70 which support an equal number of blades 26, hinges 38 and blade limiters 40. Electrical energy is produced by variable speed generator 66. Under the configuration of the blades 26, hinges 38 and blade limiters 40 shown in FIG. 9, the direction of rotation of central hub 24 will always be counter clockwise 36 regardless of the direction of flow of the river or tidal estuary. FIG. 10 depicts device 68 when viewed from upstream or downstream. Variable speed generator 66 is coupled to central hub 24 via linkage 72.

FIGS. 11A and 11B show a series of devices 20 of commercial scale size positioned in channel 74. Each device 20 produces power independent of the other.

The above embodiments have been given by way of example only. Further examples will occur to those of skill in the art without departing from the spirit of the invention.

I claim:

1. A device for converting the natural flow of a motive fluid, such as air or ocean or river current or the movement of ocean waves, to rotational mechanical motion useful for power generation, comprising;

(A) a motive fluid capturing means;

(B) a plurality of said motive fluid capturing means attached to the periphery of a circular hub by an equal plurality of cooperating hinged connection means and motion limiting means;

wherein the motion limiting means comprises;

(i) a structural component having a cross section in the form of an "L" fabricated of metal, plastic, composite material or other material suitable to withstand the corrosive effects of the motive fluid and structural strength to resist the stresses imposed upon it by the motive fluid;

(ii) said structural component having lengths of arms of the "L" much greater than the thickness of said cross section;

(iii) the structural component being sandwiched between the other hinge leaf and the circular hub and is attached to the circular hub by a plurality of fasteners through said other hinge leaf and one arm of the structural component;

(iii) thereby restricting the motion of the blade to within the 90 degree arc formed by said arms of the structural component;

(C) said circular hub being constructed of a material with sufficient strength, diameter and length to support the weight and torque of the motive fluid capturing means, said hinged connection means and said motion limiting means when it is rotating under the influence of said motive fluid;

(D) the motion of each of the motive fluid capturing means being restricted by the motion limiting means to within the 90 degree angle formed by the tangent and perpendicular lines drawn at the points where each of the motive fluid capturing means are attached to the circular hub;

(E) the circular hub having a shaft passing through the center of it from one end to the other end, said shaft with a diameter and length sufficient to support the weight and torque of the circular hub when it is rotating under the influence of the motive fluid;

(F) the shaft supported by a plurality of bearings to permit the shaft and circular hub to rotate with minimal frictional resistance;

(G) a power transmission means connected to the shaft to transfer the rotational movement of the shaft to a power generation means;

(H) the hinged connection means, fluid capturing means and motion limiting means cooperating so that the rotational direction of the circular hub is always the same regardless of the direction of approach of the motive fluid; and (I) a support means upon which the circular hub, the shaft, the plurality of bearings, said power transmission means, and said power generation means are mounted, whereby said support means has the strength to support the weight of the circular hub, the shaft, the plurality of bearings, the power transmission means, and the power generation means, and to resist the torque produced when the circular hub is rotating under the influence of the motive fluid.

2. The device in claim 1, wherein:

(A) the motive fluid capturing means comprises:

(i) a blade fabricated of metal, plastic, composite material or other material suitable to withstand the corrosive effects of the motive fluid and structural strength to resist the stresses imposed upon it by the motive fluid and which has a width and height much greater than its thickness;

(ii) said width and said height being determined by the amount of torque desired to be produced when impinged by the motive fluid;

(iii) said thickness is such dimension sufficient to support the weight of said blade, to resist the bending forces imposed upon the blade by the influence of the motive fluid, and the forces acting upon the blade when it is rotating at the rotational speed of the circular hub;

(B) the hinged connection means comprises; (i) a hinge having two hinge leafs fabricated of metal, plastic, composite material or other material suitable to withstand the corrosive effects of the motive fluid; (ii) whereby one of the said hinge leafs is connected to the blade by a plurality of fasteners; and (iii) the number of hinges connected to each blade is determined by the length of each hinge, the stresses expected to be imposed upon it or them, and the width and height of the blade to which the hinge or hinges are attached;

(C) the power transmission means comprising a system of gears to transmit the torque of the shaft to the power generation means;

(D) the power generation means comprising an electrical generator which converts the torque of the shaft to useful electrical energy;

(E) the support means comprises a structure fabricated of metal, plastic, composite material or other material suitable to withstand the corrosive effects of the motive fluid and structural strength to resist the stresses imposed upon it by the weight of the communicating devices mounted on it; and (F) the motive fluid is the natural flow of air or ocean or river current or the movement of ocean waves.

3. A device for converting the natural flow of stream or river current to rotational mechanical motion useful for power generation, comprising;

(A) a support constructed of a material such as carbon steel which is resistant to corrosion while immersed in water or which may be coated with a corrosion resistant coating, which further comprises a plurality of vertical legs with foot pads to permit said support to be located on the bottom of a flowing stream or river, the support being of sufficient size to permit the mounting of a circular hub, a plurality of hinged blades attached to said circular hub through an equal plurality of blade limiters, a shaft, a plurality of bearings to support said shaft, a system of gears for power transmission, and a device for power generation, whereby the support has the strength to support the weight of the circular hub, the plurality of said hinged blades, the plurality of said blade limiters, the shaft, the plurality of said bearings, said system of gears for power transmission, and said device for power generation, and to resist the torque produced when the circular hub is rotating under the influence of said natural flow of stream or river current;

(B) the circular hub having two flat surfaces and a outer radial surface which are fixed to each other to form a hollow cylinder;

(C) the circular hub having the shaft passing through the center of it from one flat surface to the other flat surface, the shaft with a diameter and length sufficient to support the weight and torque of the circular hub when it is rotating under the influence of the natural flow of stream or river current;

(D) the shaft supported in the vertical position by a plurality of bearings to permit the shaft and circular hub to rotate with minimal frictional resistance;

(E) the hinged blades each comprising;
  (i) a rectangular surface which has a width and height much greater than its thickness;
  (ii) said width is proximately equal to the distance between the flat surfaces forming the circular hub;
  (iii) said height is proximately equal to the width;
  (iv) said thickness is such dimension sufficient to support the weight of said rectangular surface and to resist the bending forces imposed upon the rectangular surface by the natural flow of stream or river current;
  (v) the rectangular surface connected at the end to be located closest to the circular hub to the leaf or leafs of one or a plurality of hinges by a plurality of fasteners;

(F) the blade limiters each comprising;
  (i) a piece of angle iron having a length proximately equal to the distance between the flat surfaces forming the circular hub and fastened by a plurality of fasteners to the circular hub so that the length of said angle iron is parallel to the shaft by sandwiching one arm of the angle iron between the circular hub and the hinge leaf or hinge leafs not connected to the rectangular surface;
  (ii) the piece of angle iron having the purpose to restrict the motion of the rectangular surface to within the limits of the tangent line of the circular hub and the perpendicular line to the circular hub where said tangent line and said perpendicular line are measured at the point where the piece of angle iron is connected to the circular hub; and
  (iii) mounted on the circular hub so that the circular hub rotates in the same direction regardless of the direction of the approach of the natural flow of stream or river current; and (G) said vertical legs are of sufficient length such that when the device is placed in a stream or a river, the gears for power transmission and the device for power generation are above the surface of said stream or said river.

4. A device for converting the natural movement of air to rotational mechanical motion useful for power generation, comprising;

(A) a support constructed of a material such as carbon steel which is resistant to corrosion when exposed to ambient air or which may be coated with a corrosion resistant coating, which further comprises a plurality of vertical legs with foot pads to permit said support to be located on the ground at sufficient elevation to capture the natural movement of air, the support being of sufficient size to permit the mounting of a circular hub, a plurality of hinged blades attached to said circular hub through an equal plurality of blade limiters, a shaft, a plurality of bearings to support said shaft, a system of gears for power transmission, and a device for power generation, whereby the support has the strength to support the weight of the circular hub, the plurality of said hinged blades, the plurality of said blade limiters, the shaft, the plurality of said bearings, said system of gears for power transmission, and said device for power generation, and to resist the torque produced when the circular hub is rotating under the influence of said natural movement of air;

(B) the circular hub having two flat surfaces and a outer radial surface which are fixed to each other to form a hollow cylinder;

(C) the circular hub having the shaft passing through the center of it from one flat surface to the other flat surface, the shaft with a diameter and length sufficient to support the weight and torque of the circular hub when it is rotating under the influence of the natural movement of air;

(D) the shaft supported in the vertical position by a plurality of bearings to permit the shaft and circular hub to rotate with minimal frictional resistance;

(E) the hinged blades each comprising;
  (i) a rectangular surface which has a width and height much greater than its thickness;
  (ii) said width is proximately equal to the distance between the flat surfaces forming the circular hub;
  (iii) said height is proximately equal to the width;
  (iv) said thickness is such dimension sufficient to support the weight of said rectangular surface and to resist the bending forces imposed upon the rectangular surface by the natural movement of air; and
  (v) the rectangular surface connected at the end to be located closest to circular hub to the leaf or leafs of one or a plurality of hinges by a plurality of fasteners;

(F) the blade limiters each comprising;
  (i) a piece of angle iron having a length proximately equal to the distance between the flat surfaces forming the circular hub and fastened by a plurality of fasteners to the circular hub so that the length of said angle iron is parallel to the shaft by sandwiching one arm of the angle iron between the circular hub and the hinge leaf or hinge leafs not connected to the rectangular surface;
  (ii) the piece of angle iron having the purpose to restrict the motion of the rectangular surface to within the limits of the tangent line of the circular hub and the perpendicular line to the circular hub where said tangent line and said perpendicular line are measured at the point where the piece of angle iron is connected to the circular hub; and
  (iii) mounted on the circular hub so that the circular hub rotates in the same direction regardless of the direction of the approach of the natural movement of air; and (G) said vertical legs are of sufficient length such that the device can capture the natural movement of air without significant interference by other natural or man-made objects.

5. A device for converting the natural flow of stream or river current to rotational mechanical motion useful for power generation, comprising;

(A) a support constructed of a material such as carbon steel which is resistant to corrosion while immersed in water or which may be coated with a corrosion resistant coating, which further comprises a plurality of vertical legs with foot pads to permit said support to be located on the bottom of a flowing stream or river, the support being of sufficient size to permit the mounting of a plurality of arms, a plurality of hinged blades attached to said plurality of arms through an equal plurality of blade limiters, a shaft, a plurality of bearings to support said shaft, a system of gears for power transmission, and a device for power generation, whereby the support has the strength to support the weight of the plurality of arms, the plurality of said hinged blades, the plurality of said blade limiters, the shaft, the plurality of said bearings, said system of gears for power transmission, and said device for power generation, and to resist the torque produced when the plurality of arms are rotating under the influence of said natural flow of stream or river current;

(B) the plurality of arms are connected to the shaft such that they uniformly extend outward from the shaft;

(C) the shaft having a diameter and length sufficient to support the weight and torque of the plurality of arms when it is rotating under the influence of the natural flow of stream or river current;

(D) the shaft supported in the horizontal position by a plurality of bearings to permit the shaft and the plurality of connected arms and to rotate with minimal frictional resistance;

(E) the hinged blades each comprising;
  (i) a rectangular surface which has a width and length much greater than its thickness;
  (ii) said width and said length are determined by the amount of torque desired to be produced by the natural flow of stream or river current;
  (iii) said thickness is such dimension sufficient to support the weight of said rectangular surface and to resist the bending forces imposed upon the rectangular surface by the natural flow of stream or river current; and
  (iv) the rectangular surface connected at the end to be located closest to the arm to the leaf or leafs of one or a plurality of hinges by a plurality of fasteners;

(F) the blade limiters each comprising;
  (i) a piece of angle iron having a length proximately equal to the length of the hinged blade and fastened by a plurality of fasteners to the arm so that the length of said angle iron is parallel to the shaft by sandwiching one side of the angle iron between the arm and the hinge leaf or hinge leafs not connected to the rectangular surface;
  (ii) the piece of angle iron having the purpose to restrict the motion of the rectangular surface to within the 90 degree arc formed by the facing sides of the angle iron; and
  (iii) mounted on the arm so that the shaft rotates in the same direction regardless of the direction of the approach of the natural flow of stream or river current; and (G) said vertical legs are of sufficient length such that when the device is placed in a stream or a river, the gears for power transmission and the device for power generation are above the surface of said stream or said river.

6. A device for converting the natural up and down motion of an ocean wave to rotational mechanical motion useful for power generation, comprising;
(A) a support constructed of a material such as carbon steel which is resistant to corrosion when exposed to salt air or immersed in salt water or which may be coated with a corrosion resistant coating, which further comprises a plurality of structural members connected to a buoy to permit said support to be located below said buoy and extending below the surface of an ocean wave, the support being of sufficient size to permit the mounting of a circular hub, a plurality of hinged blades attached to said circular hub through an equal plurality of blade limiters, a shaft, a plurality of bearings to support said shaft, a system of gears for power transmission, and a device for power generation, whereby the support has the strength to support the weight of the circular hub, the plurality of said hinged blades, the plurality of said blade limiters, the shaft, the plurality of said bearings, said system of gears for power transmission, and said device for power generation, and to resist the torque produced when the circular hub is rotating under the influence of the up and down movement of the buoy on the surface of the ocean wave;

(B) the circular hub having two flat surfaces and a outer radial surface which are fixed to each other to form a hollow cylinder;

(C) the circular hub having the shaft passing through the center of it from one flat surface to the other flat surface, the shaft with a diameter and length sufficient to support the weight and torque of the circular hub when it is rotating under the influence of the up and down movement of the buoy on the surface of the ocean wave;

(D) the shaft supported in the horizontal position by a plurality of bearings to permit the shaft and circular hub to rotate with minimal frictional resistance;

(E) the hinged blades each comprising;
  (i) a rectangular surface which has a length and width much greater than its thickness;
  (ii) said length is proximately equal to the distance between the flat surfaces forming the circular hub;
  (iii) said width is determined by the amount of torque desired to be produced by the up and down motion of the buoy on the surface of the ocean wave;
  (iv) said thickness is such dimension sufficient to support the weight of said rectangular surface and to resist the bending forces imposed upon the rectangular surface by the influence of the up and down movement of the buoy on the surface of the ocean wave; and
  (v) the rectangular surface connected at the end to be located closest to circular hub to the leaf or leafs of one or a plurality of hinges by a plurality of fasteners;

(F) the blade limiters each comprising;
  (i) a piece of angle iron having a length proximately equal to the distance between the flat surfaces forming the circular hub and fastened by a plurality of fasteners to the circular hub so that the length of said angle iron is parallel to the shaft by sandwiching one arm of the angle iron between the circular hub and the hinge leaf or hinge leafs not connected to the rectangular surface;
  (ii) the piece of angle iron having the purpose to restrict the motion of the rectangular surface to within the limits of the tangent line of the circular hub and the perpendicular line to the circular hub where said tangent line and said perpendicular line are measured at the point where the piece of angle iron is connected to the circular hub; and
  (iii) mounted on the circular hub so that the circular hub rotates in the same direction regardless of the direction of the up and down movement of buoy on the surface of the ocean wave; and (G) the support is of sufficient dimension such that when the device is placed in the ocean, the gears for power transmission and the device for power generation are above the surface of the ocean.

7. A method for converting the natural flow of stream or river current to rotational mechanical motion useful for power generation, comprising;
(A) placing in a stream or river current a support constructed of a material such as carbon steel which is resistant to corrosion while immersed in water or which may be coated with a corrosion resistant coating, which further comprises a plurality of vertical legs with foot pads to permit said support to be located on the bottom of a flowing stream or river, the support being of sufficient size to permit the mounting of a circular hub, a plurality of hinged blades attached to said circular hub through an equal plurality of blade limiters, a shaft, a plurality of bearings to support said shaft, a system of gears for power transmission, and a device for power generation, whereby the support has the strength to support the weight of the circular hub, the plurality of said hinged blades, the plurality of said blade limiters, the shaft, the plurality of said bearings, said system of gears for power transmission, and said device for power generation, and to resist the torque produced when the circular hub is rotating under the influence of said natural flow of stream or river current;

(i) the circular hub having two flat surfaces and a outer radial surface which are fixed to each other to form a hollow cylinder;

(ii) the circular hub having the shaft passing through the center of it from one flat surface to the other flat surface, the shaft with a diameter and length sufficient to support the weight and torque of the circular hub when it is rotating under the influence of the natural flow of stream or river current;

(iii) the shaft supported in the vertical position by a plurality of bearings to permit the shaft and circular hub to rotate with minimal frictional resistance;

(iv) the hinged blades each comprising;
  (1) a rectangular surface which has a width and height much greater than its thickness;
  (2) said width is proximately equal to the distance between the flat surfaces forming the circular hub;
  (3) said height is proximately equal to the width;
  (4) said thickness is such dimension sufficient to support the weight of said rectangular surface and to resist the bending forces imposed upon the rectangular surface by the natural flow of stream or river current;
  (5) the rectangular surface connected at the end to be located closest to circular hub to the leaf or leafs of one or a plurality of hinges by a plurality of fasteners;

(v) the blade limiters each comprising;
  (1) a piece of angle iron having a length proximately equal to the distance between the flat surfaces forming the circular hub and fastened by a plurality of fasteners to the circular hub so that the length of said angle iron is parallel to the shaft by sandwiching one arm of the angle iron between the circular hub and the hinge leaf or hinge leafs not connected to the rectangular surface;
  (2) the piece of angle iron having the purpose to restrict the motion of the rectangular surface to within the limits of the tangent line of the circular hub and the perpendicular line to the circular hub where said tangent line and said perpendicular line are measured at the point where the piece of angle iron is connected to the circular hub; and
  (3) mounted on the circular hub so that the circular hub rotates in the same direction regardless of the direction of the approach of the natural flow of stream or river current;

(vi) whereby said vertical legs are of sufficient length such that when the device is placed in a stream or a river, the gears for power transmission and the device for power generation are above the surface of said stream or said river.

* * * * *